Figure 1:
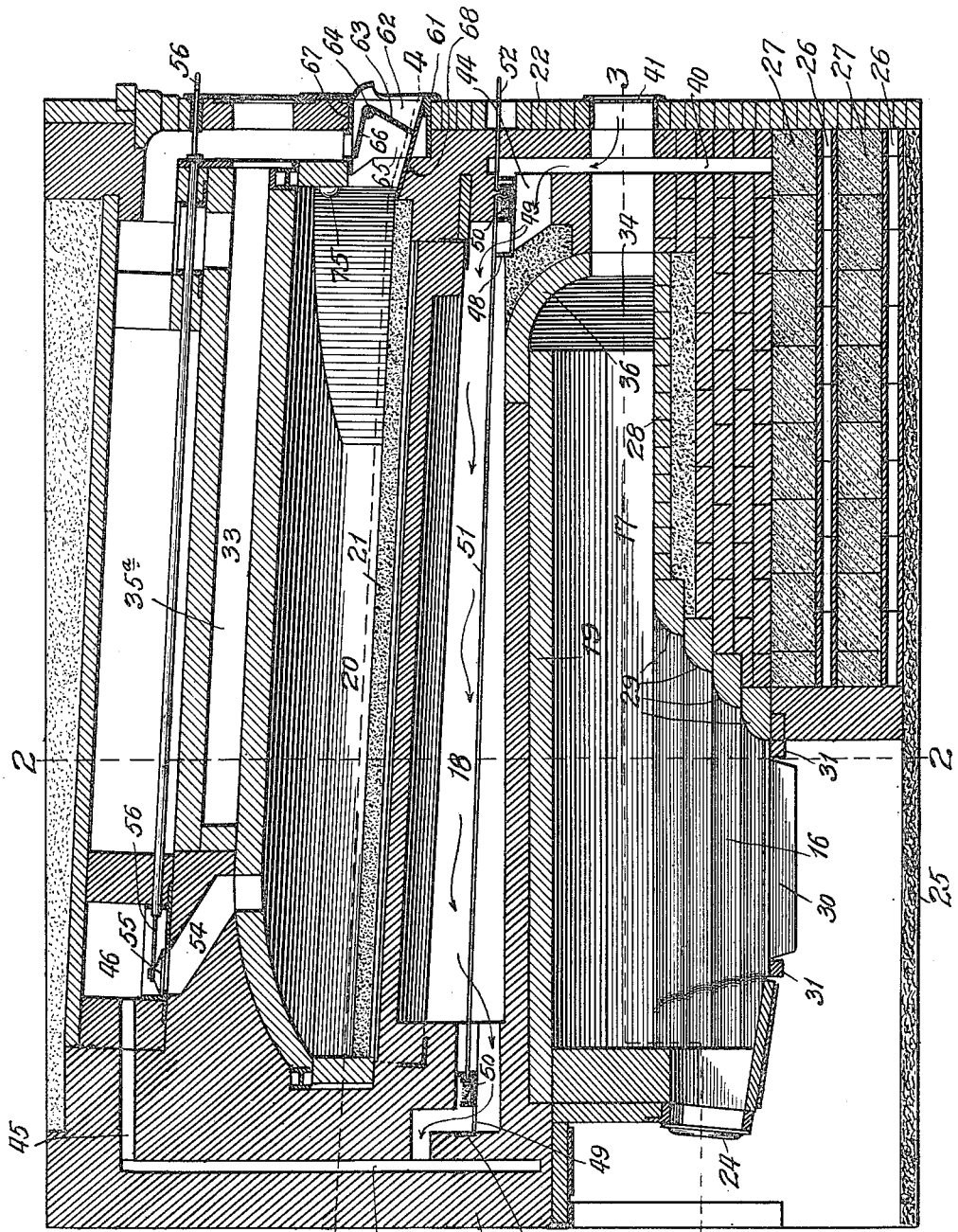

C. W. HELM.
BAKING OVEN.
APPLICATION FILED SEPT. 24, 1914.

1,165,409.

Patented Dec. 28, 1915.
6 SHEETS—SHEET 5.

Witnesses:
John Endere
Mildred Stumpf

Inventor:
C. Wells Helm
by Fred Gerlach
his Atty.

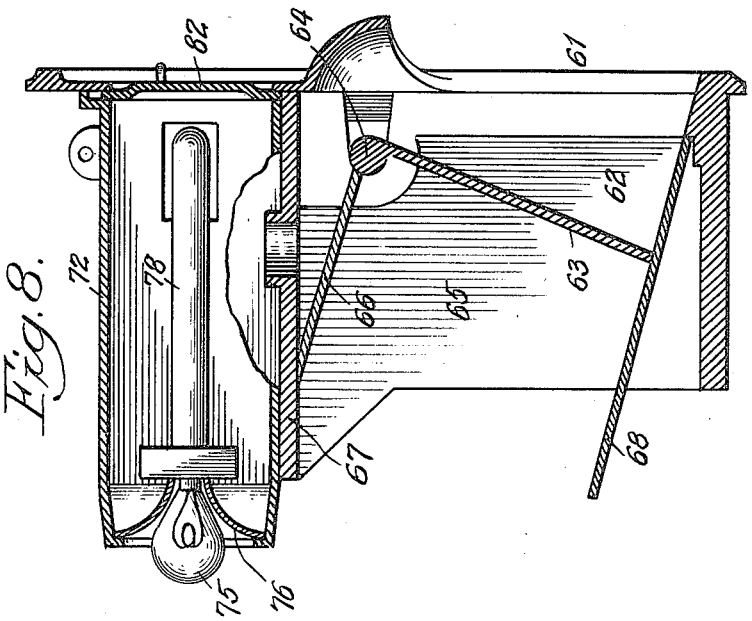
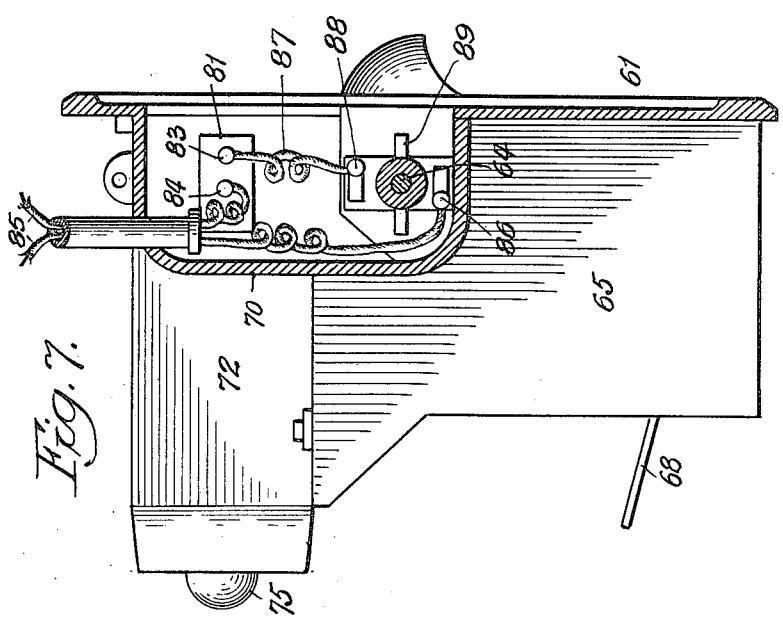
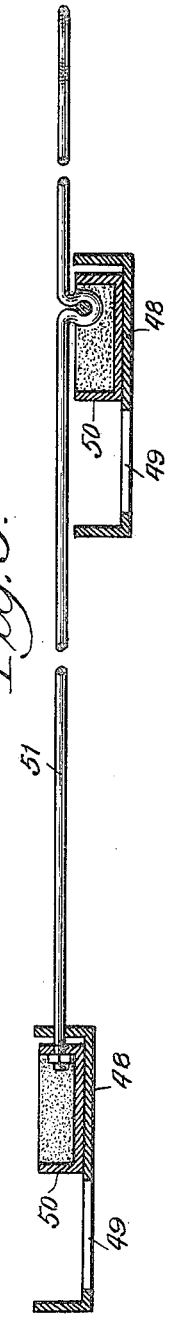

UNITED STATES PATENT OFFICE.

C. WELLS HELM, OF CHICAGO, ILLINOIS.

BAKING-OVEN.

1,165,409.  Specification of Letters Patent.  Patented Dec. 28, 1915.

Application filed September 24, 1914. Serial No. 863,263.

*To all whom it may concern:*

Be it known that I, C. WELLS HELM, a resident of Chicago, in the county of Cook and State of Illinois, have invented certain new and useful Improvements in Baking-Ovens, of which the following is a full, clear, and exact description.

The invention relates to baking ovens.

In baking ovens, a desideratum is to provide a baking chamber of maximum area to give the greatest baking capacity. In these ovens, it is customary to provide flues for the products of combustion in the corners of the walls of the oven and heretofore the capacity of the baking chamber was materially lessened by the necessity of providing a sufficient thickness of wall between the flues and the baking chamber to prevent burning of the bread or food being baked.
This necessity, besides reducing the capacity of the baking chamber, necessitated the use of but a single charging door.

A further desideratum is to provide charging openings or doors which afford ready access to all parts of the baking chamber for conveniently charging, and removal of the baked bread from the baking chamber.

One object of the invention is to provide an improved baking oven in which the flues for the products of combustion are disposed in the corners of the structure forming the walls of the oven and in which an increased baking capacity is attained by providing a structure which permits a comparatively thin dividing wall between the flues and the baking chamber, provision being made to prevent burning of the bread in the baking chamber and adjacent the flues by heat insulation. As a result of this construction, the capacity of the baking chamber is increased and a wider front opening is possible so that a pair of charging openings or doors may be installed for the baking chamber, and charging of the baking chamber and removal of the bread therefrom may be more readily and quickly done because the sloping side-walls adjacent the front of the oven may be formed at a less acute angle than has heretofore been possible.
A further object of the invention is to provide an improved fire box for the oven which has a maximum capacity permitted by the walls of the oven and which is so formed that likelihood of coke being thrown to the rear of the fire box, as frequently occurs in ovens now in use, will be avoided.

A further object of the invention is to provide an improved front for the baking chamber which is adapted for and provided with a pair of charging doors which permit ready access to all portions of the baking chamber.

A further object of the invention is to provide means for regulating the temperature of the baking oven by varying the air current passing through the air space between the top of the combustion chamber and the bottom of the baking chamber, so that the cooling effect of the air may be regulated as may be desired in baking.

A further object of the invention is to provide improved means for insulating the bottom of the oven from the floor of the building where it is erected on a floor and this object is attained by the use of alternating layers of cork brick and hollow tile and asbestos fire board which do not materially add to the weight of the oven.

A further object of the invention is to provide a structure in which the use of tile at the back of the combustion chamber may be dispensed with and this object is attained by providing a curved area of fire brick which does not crack as a straight wall of tile does.

Lastly, the invention designs to provide a baking oven of improved construction.

The invention consists in the several novel features hereinafter set forth and more particularly defined by claims at the conclusion thereof.

Figure 2:
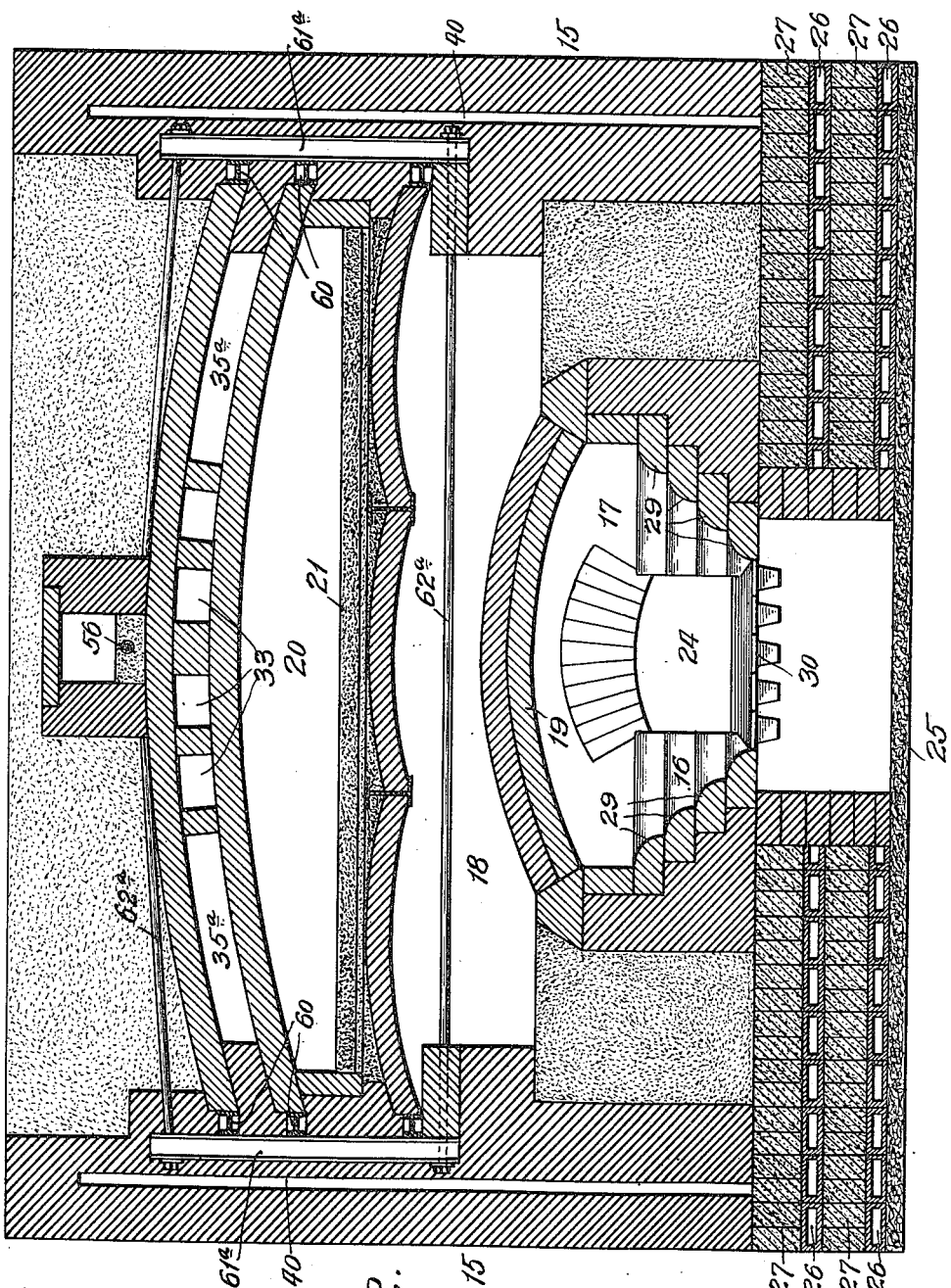
Figure 3:
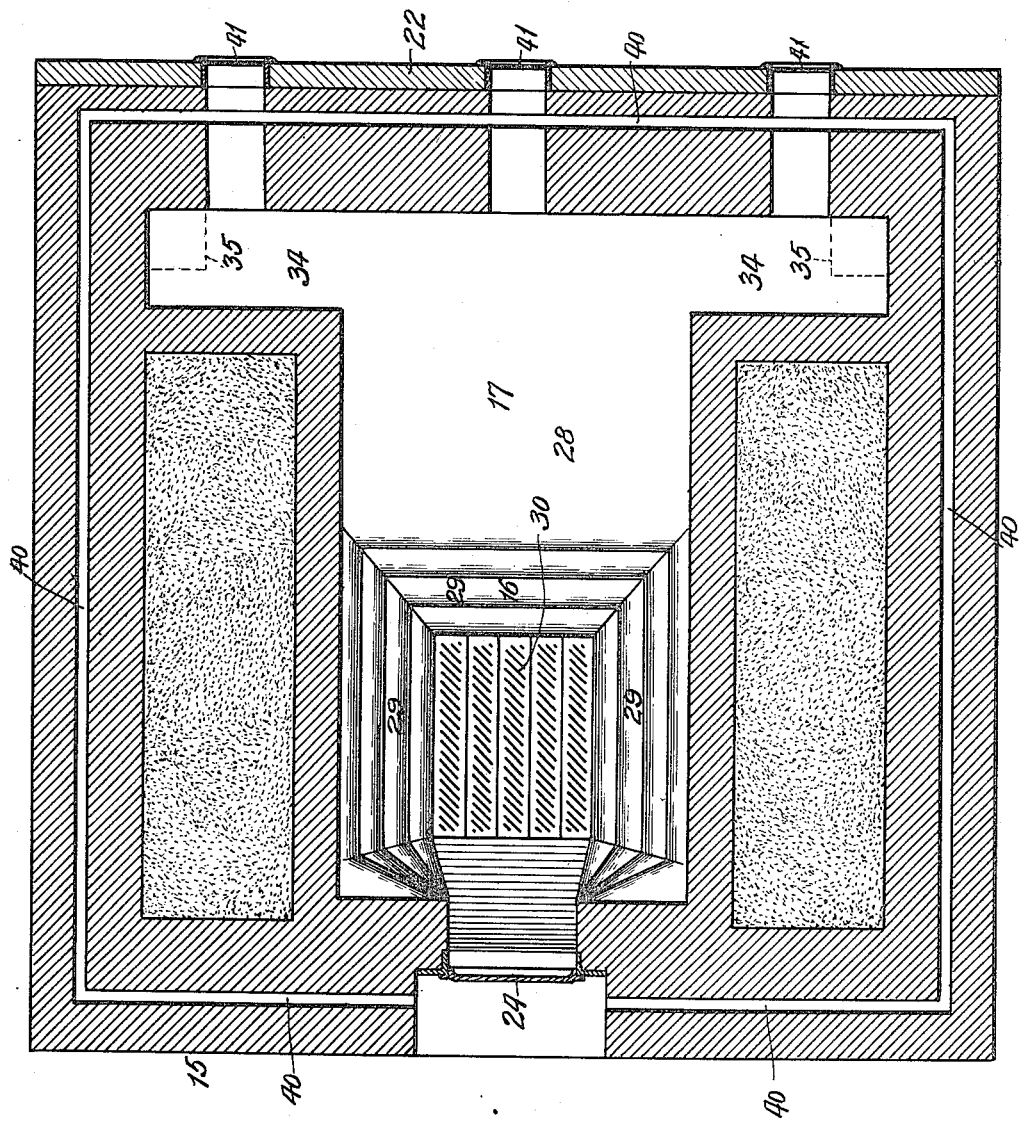
Figure 4:
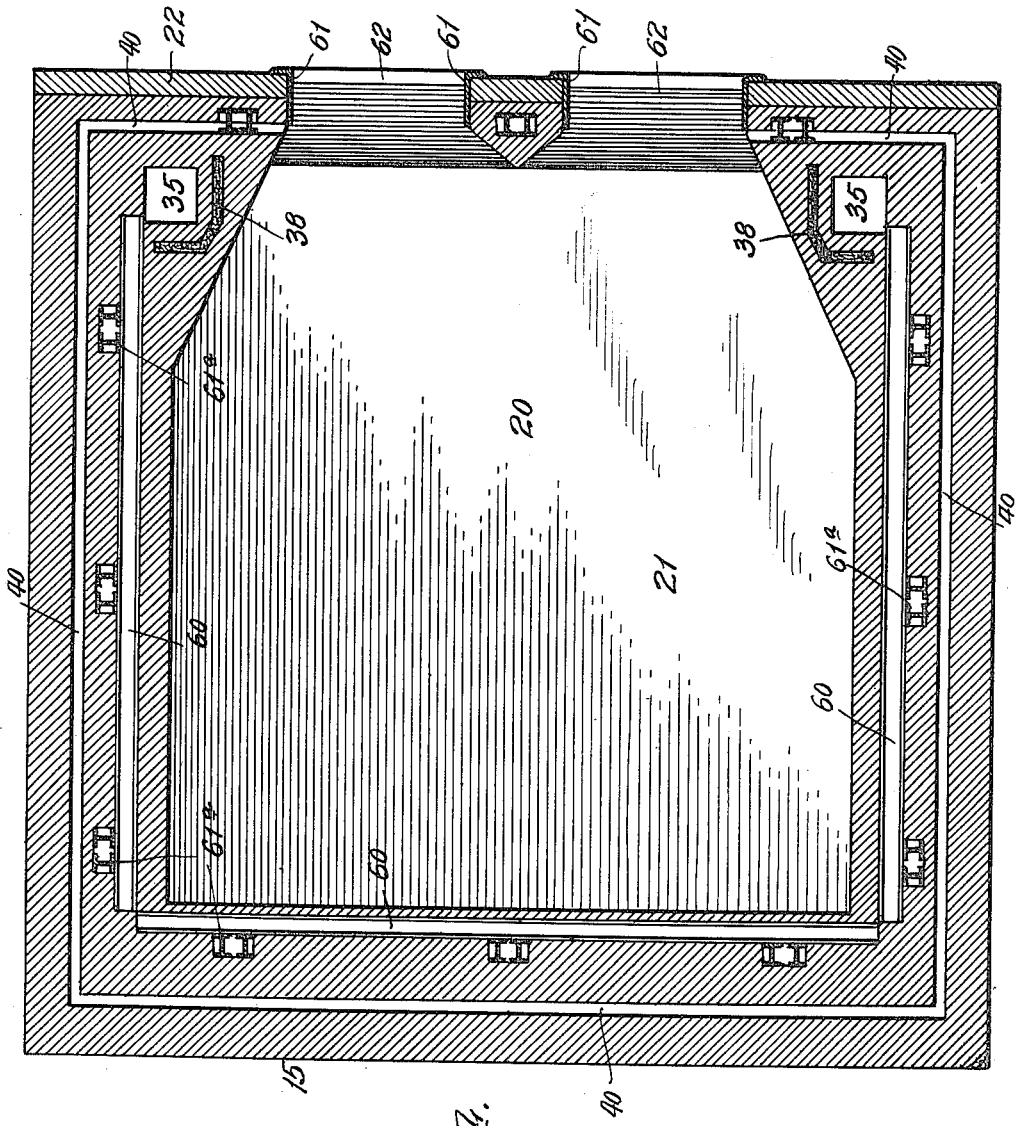
Figure 5:
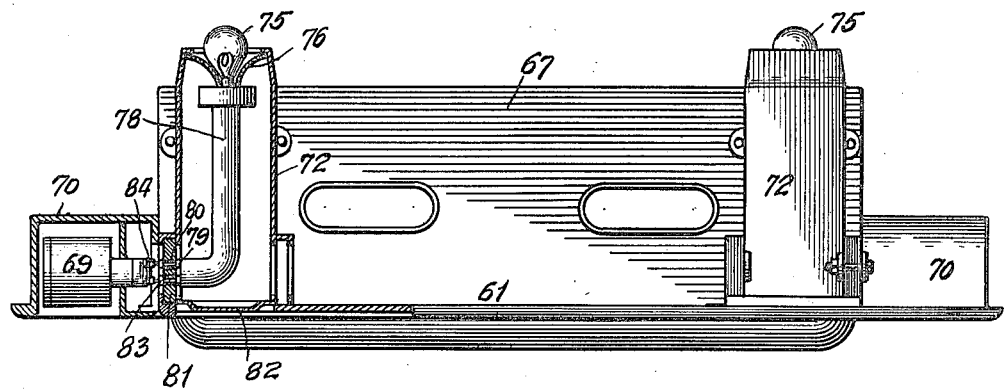
Figure 6:
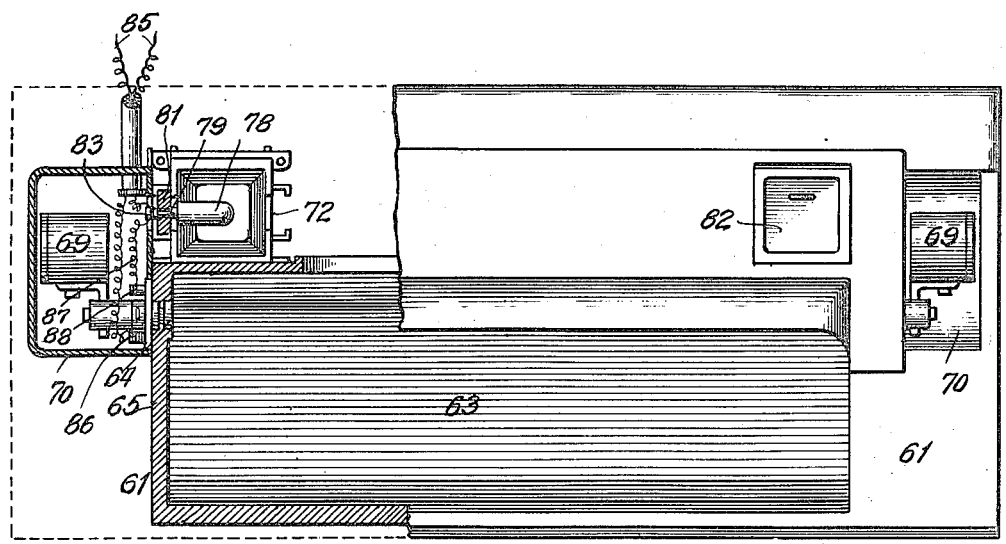

In the drawings: Figure 1 is a vertical longitudinal section of an oven embodying the invention. Fig. 2 is a transverse section taken on line 2—2 of Fig. 1. Fig. 3 is a horizontal section taken on line 3—3 of Fig. 1. Fig. 4 is a horizontal section taken on line 4—4 of Fig. 1. Fig. 5 is a detail plan of one of the charging doors, parts being shown in section. Fig. 6 is a front view of the parts shown in Fig. 5. Fig. 7 is a detail of the connections for the lighting apparatus, the light tube and charging door frame, being shown in section. Fig. 8 is a vertical section through one of the charging doors and the lighting apparatus at one end thereof. Fig. 9 is a detail of the draft-regulating apparatus for the air chamber below the baking chamber.

The improved baking oven comprises a structure of masonry 15, forming the walls of the oven in which are formed a fire box 16, a combustion chamber 17, a baking chamber 20, an air chamber 18, disposed between the roof 19 of the combustion chamber and the floor 21 of the baking chamber and smoke flues 33. Usually a tile-brick facing 22 is provided at the front of the oven. A suitable door 24 is disposed at the rear of the oven and through this door, fuel, usually coke, may be fed to the fire-box 16. In many instances, it is desirable to install these ovens upon a floor that is without special support or not specially constructed for these ovens and in such instances, it is desirable to insulate the oven from the floor and to prevent the heat from passing through the floor and to avoid the weight of a thick base under the inclosing structure of the oven for the purpose of insulating the oven from the floor of the building. To meet these conditions, the base of the oven structure consists of a course of insulating material 25, such as asbestos upon which are laid alternate courses of hollow tile 26 and cork brick 27. Two courses of hollow two inch tile and two courses of four inch cork brick have been found, in practice, to efficiently insulate the lower portion of the oven from the floor without unduly increasing the weight of the oven structure. This cork brick, which is composed of mixed diatomaceous earth and ground cork, provides efficient insulation and is much lighter than refractory material, and the alternate courses of hollow tile provide for efficient insulation and support the oven structure above the base.

A desideratum in baking ovens is to provide a fire box of maximum depth and capacity and one which will prevent the fuel or coke from being thrown backwardly upon the floor 28 of the combustion chamber where it will not be consumed and, therefore, wasted. This requirement is attained by providing a fire box of increased depth and stepped or terraced brickwork above and around the back and sides of the grate bars, as at 29. Grate bars 30, in desired number are supported upon rails 31. By placing these grate bars lower than has heretofore been deemed possible, the top of the fuel door 24 will be disposed so low with respect to the floor 28 of the combustion chamber that the coke will pile up in the box and not be thrown onto said floor. As a result of this construction, no ashes or coke will be carried or thrown onto the floor of the combustion chamber where they will interfere with combustion and clog the combustion chamber. This construction is such that a careless fireman, in charging the fire box, will not throw the coke in back of the fire box, and the fuel capacity is increased by the stepped sides and back of the fire box.

The roof 19 of the combustion chamber is arched transversely and extends rearwardly to a cross flue 34 which conducts the products of combustion to two stacks or upright flues 35 which are disposed adjacent the front corners of the structure and lead into horizontal spaces 35$^a$ above the roof of the baking chamber and may be connected, in manner well understood in the art, to the chimney. The top of the cross flue at the back of the combustion chamber has heretofore been formed of straight or horizontally laid tile. In practice, it has been found that such formation becomes cracked, permitting the products of combustion to work through to the air chamber 18 and to burn the goods in the baking chamber. To overcome this objection, an arch 36 of fire brick is formed at the back and top of the cross flue and rear of the combustion chamber. In practice, it has been found that this arch effectively prevents cracking of the wall at the rear end of the combustion chamber and the cross flues and thus the leakage of the products of combustion into the air chamber where they will contact with the floor of the baking chamber is eliminated.

Heretofore, it has been the practice to build a thick wall of refractory material between the upright flues 35 and the baking chamber to prevent the bread in the front portion of the baking chamber from being burned. It has been necessary to form that wall so thick that the capacity of the baking chamber was materially lessened and furthermore, the opening for the door at the front of the oven was restricted so that the side portions of the baking chamber were not readily accessible and could not be well illuminated for inspection. To overcome this objection, a filling or course of asbestos 38 is built into the wall between the upright flues 35 and the side of the baking chamber, this asbestos being disposed and extending adjacent and around the inner side and rear of the flues. By employing asbestos in this manner, it has become possible to very materially reduce the thickness of the wall between the flues 35 and the baking chamber without danger of burning the bread in the baking chamber from the heat in the upright flues. In reducing the thickness of this wall, the capacity of the baking chamber is increased and the opening at the front of the baking chamber for the door or doors may be extended much closer to the upright flues than has heretofore been possible. Furthermore, by reducing the acuteness of the sides of the baking chamber adjacent its front, the chamber may be more conveniently charged and unloaded.

An air space 40 is formed in the structure and extends around the back, sides and front thereof. Screened inlets 41 permit air to pass from the outside to space 40 and also serve as openings which give access to the cross flue 34 and the back of the combustion chamber 17. Ducts 44, one at each side of the oven, connect air space 40 with the air chamber 18 which is disposed between the roof of the combustion chamber and the floor of the baking chamber. At the rear of the structure, air chamber 40 is connected by ducts 45'; one at each side, with a flue 46 which communicates with the smoke passages 35ª. At the front and back of air chamber 18, channel irons 48 are secured in the structure and these channel irons are provided with openings 49 for the inlet and egress of air respectively. Valves 50, are slidably mounted upon the channel bars 48, respectively and are adapted to close the openings 49 more or less to regulate the circulation of air through chamber 18. A rod 51 is secured to both valves 50 and is extended to the front of the structure, as at 52, for convenience in manipulating the val.es. It will be understood that a rod 51 and a pair of valves 50 are provided for each side of the oven. These valves exemplify means for regulating the flow of air through the chamber 18 to vary the cooling effect of the air upon the baking chamber.

A flue 54 leads from the top of the baking chamber to outlet 46 to carry off condensation from the baking chamber, and a suitable valve 55 secured to a rod 56, which is extended to the front of the oven, is provided for the manipulation of said valve. Abutment rails 60, buckstays 61ª and the rods 62ª are used to reinforce the structure, as well understood in the art.

As a result of the narrowing of the walls between the upright flues 35 and the sides of the baking chamber, it is possible to conveniently employ two charging doors for the baking chamber. Each door structure comprises a rectangular frame 61 which fits around each door-opening 62 of the structure, and a door 63, which is pivoted as at 64 in the sides 65 of a frame 61. A shield 66 extends from the door pivot to the top wall 67 of each frame 61. A plate 68 extends from the lower front portion of each frame 61 to the floor 21 of the inclined baking chamber. Counterweights 69 are suitably secured to the pivot of each door, which, when the door is shifted into open position, serve to hold the doors open and also serve to hold the doors closed. The housing 70, for each counterweight, is set into the front wall of the structure 15.

A housing 72 is secured to the top of wall 67 of the door frame, and one of these housings is secured adjacent each end of each door frame, thus making provision for two lights above each door. These housings extend through the wall at the front of the baking chamber and each contains an incandescent electric lamp 75 and a reflector 76. The lamp 75 and the reflector 76 are secured to a support or tube 78 which contains the electrical connections for the lamp and plug contacts 79 which are adapted to be inserted into socket-contacts 83, 84 in a block 81. By moving the rear end of tube 78 sidewise to withdraw contacts 79, 80 from block 81, the lamp and tube may be disconnected from the block so that the tube, lamp and reflector may be withdrawn through a removable front door 82. This construction permits the lights to be readily placed into the housing 72 to be removed therefrom whenever a lamp is to be replaced or the reflector is to be cleaned, and also permits one lighting apparatus to be removed if only one is deemed necessary. One of the leading-in conductors 85 is connected to socket contact 84 and the other to a contact 86. A short conductor 87 electrically connects contact 83 to a contact 88. A two-armed switch 89 is secured to the door pivot 64 and is operated by the door so that when the door is open, the switch will be closed to light the lamp 75 and when the door is closed, the switch will be opened.

As a result of disposing the light housings 72 on the top of the door frame, the light is diffused in the baking chamber and is disposed above the point of view so that shadows will be avoided, and the contents of the baking chamber may be readily seen through a door. As a result of employing the housing 72 around the tube 78 and extending through the wall at the front of the baking chamber, the leakage of steam is avoided. As a result of employing the light-support or tube 78 with its contacts separable from its fixed contacts on block 81, the removal and replacement of the lamp and reflector are greatly facilitated.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a baking oven, the combination of a structure, having a fire box and a baking chamber therein, and a base for the structure comprising alternate courses of hollow tile and cork brick.

2. In a baking oven, the combination of a structure having a fire box and a baking chamber therein, and an insulating base for the structure comprising a lower course of heat-insulating fiber and alternate courses of hollow tile and cork brick.

3. In a baking oven, the combination of a structure provided with a horizontally extending combustion-chamber, a baking chamber above the combustion chamber and a fire box disposed at one end of the combustion chamber and having grate bars therein, a fuel door leading to the fire-box, and a stepped wall between the grate-bars and the floor of the combustion chamber.

4. In a baking oven, the combination of a structure provided with a horizontally extending combustion chamber, a baking chamber above the combustion chamber and a fire box disposed at one end of the combustion chamber and having grate bars therein and a fuel door leading to the fire box, the fire box having stepped side and end walls and extending from the grate bars to the floor of the combustion chamber.

5. In a baking oven, the combination of a structure having a fire box a horizontally extending combustion chamber and a baking chamber therein and having an air chamber between the fire box and the baking chamber, upright flues adjacent the corners of the structure, a cross flue at the back of the combustion chamber leading to the upright flues, and an arch of fire-brick at the back and top of the cross-flue.

6. In a baking oven, the combination of a structure having a fire box a horizontally extending combustion chamber and a baking chamber therein and having an air chamber between the fire box and the baking chamber, upright flues adjacent the corners of the structure, a cross flue extending laterally from both sides of the back of the combustion-chamber leading to the upright flues, and an arch of fire brick at the back and top of the combustion chamber and the cross flue.

7. In a baking oven, the combination of a structure having a fire box and a baking chamber above the fire box, upright flues in the corners of the structure communicating with the fire box, the structure having a wall between each of the upright flues and the baking chamber, and a course of heat-insulation in said walls for preventing overheating of the baking chamber by the products of combustion in said flues.

8. In a baking oven, the combination of a structure having a fire box and a baking chamber above the fire box, upright flues in the corners of the structure communicating with the fire box, the structure having a wall between each of the upright flues and the baking chamber and a course of heat insulating material in said walls and disposed inwardly and rearwardly of the flues for preventing overheating of the baking chamber by the products of combustion in said flues.

9. In a baking oven, the combination of a structure having a fire box and a baking chamber therein and having an air chamber between the top of the fire box and the bottom of the baking chamber, air ducts at the front and back of said air chamber, respectively, valves at the front and back of said chamber for regulating the flow of air through said chamber and a connection between said valves whereby they will be conjointly shifted.

C. WELLS HELM.

Witnesses:
  Mildred Stumpf,
  Katharine Gerlach.